May 12, 1936.   R. D. CORKE   2,040,429
ROTARY ELEMENT SEAL
Filed Oct. 25, 1933   2 Sheets-Sheet 1
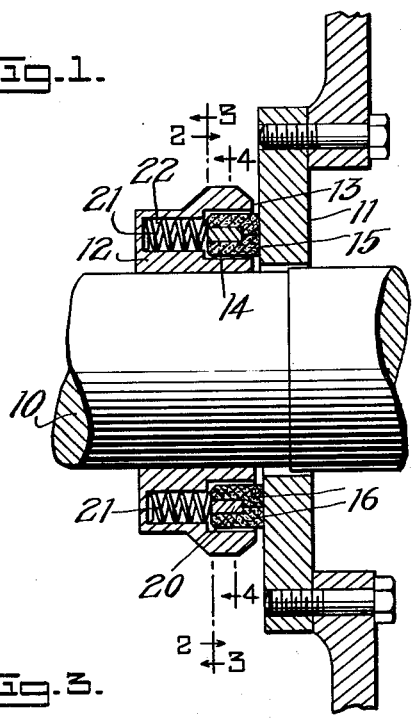
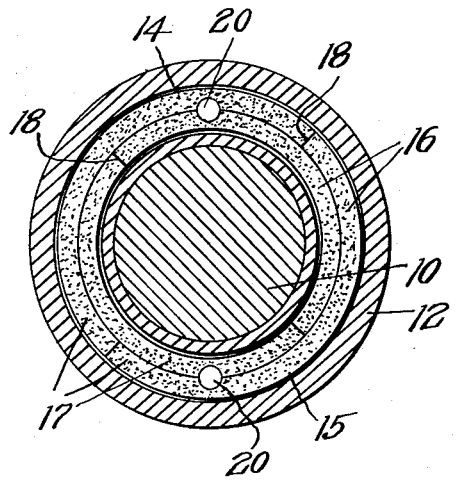
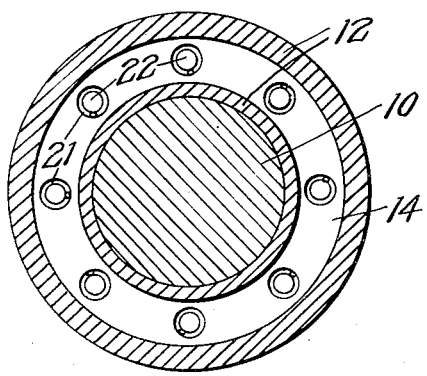
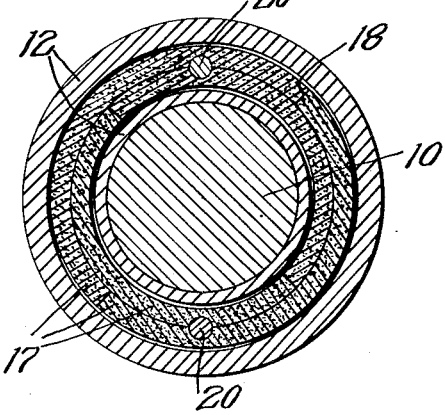
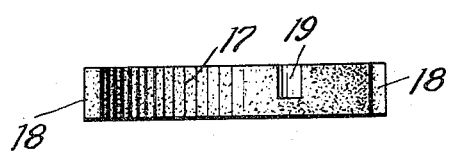
INVENTOR
Ruloff D. Corke
BY
[signature] ATTORNEY May 12, 1936.   R. D. CORKE   2,040,429
ROTARY ELEMENT SEAL
Filed Oct. 25, 1933   2 Sheets-Sheet 2
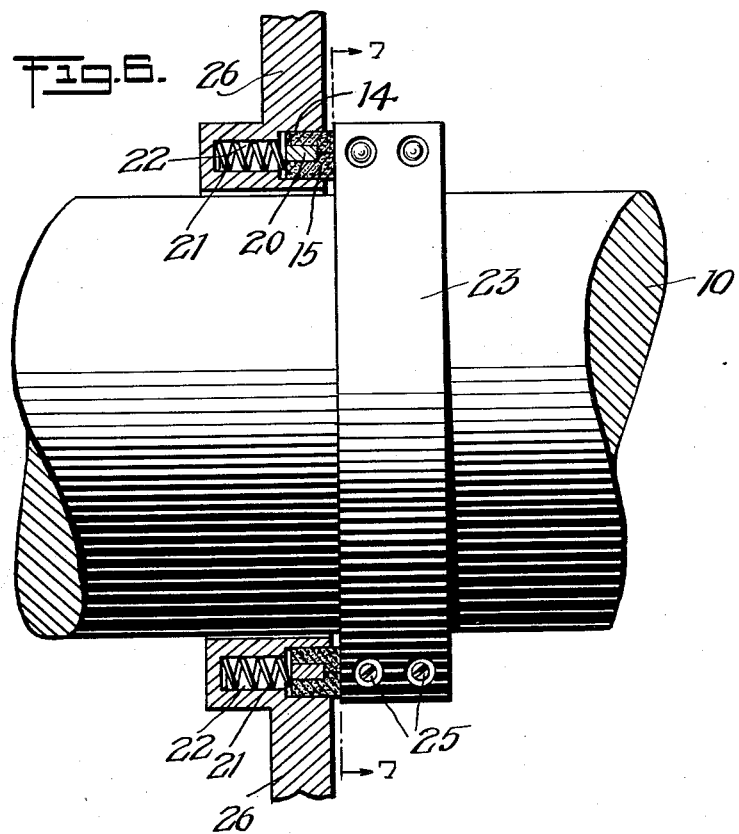
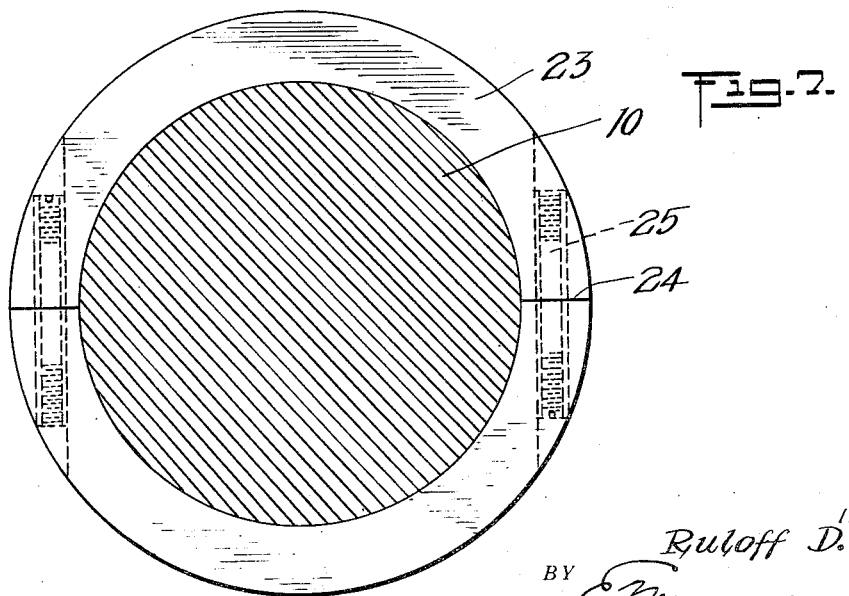
INVENTOR
Ruloff D. Corke
BY
ATTORNEY Patented May 12, 1936

2,040,429

UNITED STATES PATENT OFFICE 2,040,429

ROTARY ELEMENT SEAL

Ruloff D. Corke, Yonkers, N. Y.

Application October 25, 1933, Serial No. 695,068

2 Claims. (Cl. 286—7)

This invention relates to rotary element seals, and more particularly to seals for elements one of which surrounds the other and between which there is relative rotation as for instance the shaft and casing of a turbine, and having as its function in that example to prevent escape of steam from between the said shaft and casing.

Among the principal objects which the present invention has in view are: To provide a seal between parts having relative rotation which will be more effective and longer lived than seals heretofore employed; to utilize a plurality of interlocked segmental sections; to maintain proper overlap of the sections; to adapt the structure to turbines or the like of various makes; and to obtain other advantages and results as may be brought out in the following description.

Drawings

Figure 1 is a side elevation of a shaft and sectional view on a plane longitudinal with respect to the shaft of a portion of a casing and of my improved rotary element seal applied thereto;

Figures 2, 3 and 4 are sectional views normal to the shaft taken on lines 2—2, 3—3, and 4—4, respectively looking in the directions indicated by the arrows;

Figure 5 is a diametric edge view of one of the segments of a lamination of the packing ring;

Figure 6 is a view similar to Figure 1 showing a modified application of the invention to a shaft and casing; and Figure 7 is a sectional view normal to the shaft on line 7—7 of Figure 6.

Description

As seen in the drawings and referring more particularly to Figures 1 to 5, the reference numeral 10 indicates a shaft as representative of a rotary element such as the shaft of a high pressure steam turbine, and reference numeral 11 indicates a surrounding part of the casing of such turbine as representative of the other or non-rotating element between which and the rotating element a seal is desired.

Upon one side of the part 11 of the casing designated in the drawings, is mounted a collar 12, in this instance made to snugly fit the shaft 10 and secured thereon so as to rotate therewith. One end face 13 of this collar is closely adjacent to a plane face portion of the casing with appropriate clearance to accommodate rotation of the collar with respect to the casing. Said face 13 of the collar is provided with an annular groove 14 preferably concentric with the collar and shaft. Within said groove is mounted my improved packing ring designated in general by numeral 15 and preferably of a laminated segmental structure.

As specifically illustrated, packing ring 15 is shown having laminations 16, 16, and each lamination comprises a plurality of segments 17, 17. As here illustrated, there are shown two segments of each lamination so that each segment is substantially semi-circular with the splits 18 between the segments upon a diametric plane thereof. In assembling the ring 15, the segments of the inner lamination preferably have the plane of splits 18, 18, disposed at an angle (as for instance a right angle as shown) to the plane of the splits between the segments of the outer lamination. For convenience this arrangement will be referred to as staggering of the splits.

In order to maintain the splits staggered as above described, I preferably provide a socket 19 in each segment so arranged that juxtaposed sockets may receive a common dowel 20. For this purpose the socket in the outer lamination opens toward the inner lamination and the sockets in the inner lamination open toward the outer lamination. It will suffice in most instances to utilize one or more dowels, and for illustrative purposes, I have chosen to show two dowels diametrically opposite each other, so that one dowel locks one pair of segments of the inner and outer laminations, whereas the other dowel locks the remaining pair of segments of the inner and outer laminations.

The packing ring 15 is pressed normally out of its groove 14 toward the plane face of the casing to engage flatwise thereagainst. According to the present showing this actuation of the packing ring is accomplished by a plurality of compressed coil springs 21 retained in bores 22 in the base of groove 14, said bores being parallel to shaft 10.

It is to be understood that the packing ring 15 does not have to be carried by the rotating element, but instead may be carried by the non-rotating element. This structure is illustrated more particularly in Figures 6 and 7, wherein shaft 10 has a collar 23 here shown as diametrically split at 24 and secured together by chordal bolts 25, normal to the plane of the split. This collar 23 provides one plane face directed toward the part 26 of the casing which surrounds the shaft as representative of the non-rotating member. This part 26 of the casing is provided with annular groove 14 for reception of packing ring heretofore described. This packing ring is urged out of groove 14 toward collar 23 by a plurality of coil springs 21 within bores 22 in the base of the groove 14 as heretofore described.

In both constructions illustrated, the packing ring 15 is carried in and from a groove in one of the elements and has a slidable sealing contact with the other element between which it is desired to effect a seal. By virtue of the laminated segmental construction of the packing ring, the splits may be staggered and the escape of steam or other pressure medium effectively prevented thereby. It may furthermore be added, that the segments of the laminations of the packing ring are preferably of graphite, but the invention is not confined to any particular material to comprise the packing ring.

I claim:

1. A rotary element seal comprising in combination with a shaft and casing between which a seal is desired, a collar secured to the shaft adjacent a face of the casing, said collar having means at its periphery for releasing the same from the shaft and permitting the collar to be backed away from the casing, the adjacent faces of the casing and collar being parallel and normal to the axis of the shaft, a packing ring circularly laminated with the laminations disposed normal to said adjacent faces of the casing and collar, said packing ring being disposed between said casing and collar and each lamination split upon radial planes normal to the said adjacent faces of the casing and collar into a plurality of segments with the splits of one lamination staggered with respect to the splits of the next adjacent lamination, and means for urging the packing ring against one of said faces for rotative sealing engagement therewith, said packing being rigid and replaceable in segments by backing the collar away without direct access to the end of the shaft or collar.

2. A rotary element seal comprising in combination with a shaft and casing between which a seal is desired, a collar secured to the shaft adjacent a face of the casing, said collar having means at its periphery for releasing the same from the shaft and permitting the collar to be backed away from the casing, the adjacent faces of the casing and collar being parallel and normal to the axis of the shaft, a packing ring circularly laminated with the laminations disposed normal to said adjacent faces of the casing and collar, said packing ring being disposed between said casing and collar and each lamination split upon radial planes normal to the said adjacent faces of the casing and collar into a plurality of segments with the splits of one lamination staggered with respect to the splits of the next adjacent lamination, and means for urging the packing ring against one of said faces for rotative sealing engagement therewith, said packing being rigid and replaceable in segments by backing the collar away without direct access to the end of the shaft or collar, and means for retaining the several segments in relatively fixed staggered position with respect to each other.

RULOFF D. CORKE.